(12) United States Patent
Xu

(10) Patent No.: US 7,402,990 B2
(45) Date of Patent: Jul. 22, 2008

(54) REDUCTION OF ENERGIZATION TRANSIENTS IN A THREE PHASE POWER SYSTEM

(75) Inventor: Wilsun Xu, 27 Rhatigan Rd., East, Edmonton, Alberta (CA) T6R 1N1

(73) Assignee: Wilsun Xu (CA)

( * ) Notice: Subject to any disclaimer, the term of this patent is extended or adjusted under 35 U.S.C. 154(b) by 444 days.

(21) Appl. No.: 11/126,931

(22) Filed: May 11, 2005

(65) Prior Publication Data

US 2005/0201029 A1    Sep. 15, 2005

Related U.S. Application Data

(63) Continuation-in-part of application No. 10/617,635, filed on Jul. 11, 2003, now Pat. No. 6,911,810.

(51) Int. Cl.
*H03H 1/00* (2006.01)
(52) U.S. Cl. ............... 323/364; 323/205; 323/208
(58) Field of Classification Search ......... 323/205, 323/208, 209, 355, 356, 361, 364; 363/39, 363/40, 50; 318/700, 705, 729, 738, 778
See application file for complete search history.

(56) References Cited

U.S. PATENT DOCUMENTS

| | | | |
|---|---|---|---|
| 3,599,069 A * | 8/1971 | Welch | 318/696 |
| 3,624,471 A * | 11/1971 | Japp et al. | 318/771 |
| 4,021,704 A * | 5/1977 | Norbeck | 361/77 |
| 4,317,076 A * | 2/1982 | Price | 323/210 |
| 4,695,918 A | 9/1987 | O'Leary | |
| 4,782,272 A | 11/1988 | Buckley et al. | |

(Continued)

OTHER PUBLICATIONS

Holgrem, B., et. al., "Transformer Inrush Current," CIGRE Proc. of the 22nd Session, vol. 1, 12-03, 1968, pp. 1-13.

(Continued)

*Primary Examiner*—Matthew V Nguyen
(74) *Attorney, Agent, or Firm*—Wong, Cabello, Lutsch, Rutherford & Brucculeri, LLP

(57) ABSTRACT

A method and an apparatus for reducing energization transients in a three phase AC power system which includes an electrical device having legs A, B and C associated with corresponding phases of the power system. The method includes the steps of connecting the legs of the device with the power system in an order determined by an energization sequence, wherein the energization sequence is either ABC or ACB. The apparatus includes a three phase electrical device having legs A, B, and C associated with corresponding phases of a three phase AC power system and switches operable to connect the legs of the device with the power system, wherein the switches are configured to be actuated in an order determined by an energization sequence, and wherein the energization sequence is either ABC or ACB. The switches may be controlled by a switch controller. A transient-limiting impedance may be connected in series with leg A of the device, in which case the method of the invention includes the further step of bypassing the transient-limiting impedance and the energization sequence is either ABCI, ABIC, ACBI or ACIB, wherein I is the step of bypassing the transient-limiting impedance. In the apparatus of the invention, a bypass switch may be provided for bypassing the transient-limiting impedance, which bypass switch may be controlled by the switch controller.

21 Claims, 6 Drawing Sheets

U.S. PATENT DOCUMENTS

| | | | |
|---|---|---|---|
| 4,818,836 A * | 4/1989 | Bebber et al. | 219/121.54 |
| 4,829,159 A | 5/1989 | Braun et al. | |
| 5,321,340 A | 6/1994 | Tamaki et al. | |
| 5,570,257 A | 10/1996 | Manning et al. | |
| 5,838,077 A | 11/1998 | Chelcun et al. | |
| 5,894,396 A | 4/1999 | Kim | |
| 5,920,186 A | 7/1999 | Ninh et al. | |
| 5,995,394 A | 11/1999 | Svensson et al. | |
| 6,018,473 A | 1/2000 | Claassen | |
| 6,218,652 B1 | 4/2001 | Kim et al. | |
| 6,218,815 B1 | 4/2001 | Kates et al. | |
| 6,337,802 B1 | 1/2002 | Larsson et al. | |
| 6,392,390 B1 | 5/2002 | Ito et al. | |
| 6,523,654 B2 | 2/2003 | Brooks | |
| 6,630,804 B2 | 10/2003 | Moriya et al. | |
| 6,909,262 B2 * | 6/2005 | Yao et al. | 322/28 |

OTHER PUBLICATIONS

Yacamini, R. et. al., "The Calculation of Inrush Current in Three-Phase Transformers," IEEE Proc.-Electr. Power Appl., vol. 133, Jan. 1986, pp. 31-40.

Mafuve, I.M., "Soft Start of AC Machines by Sequential Phase Switching," Proc. of the Univ.-Power Engineering Conference, V.2, 1999, Leicester, U.K.

Ofuji Shiya et. al., "New Switching Sequences for Three Phase Converter wth ZVS Using a Transformer," IEEE, PCC-Nagaoka 1997, V.2, pp. 797-800.

* cited by examiner

REDUCTION OF ENERGIZATION TRANSIENTS IN A THREE PHASE POWER SYSTEM

CROSS-REFERENCE TO RELATED APPLICATIONS

This application is a continuation-in-part of U.S. application Ser. No. 10/617,635 filed Jul. 11, 2003, now U.S. Pat. No. 6,911,810 entitled "Reduction of Energization Transients In A three Phase Y-Connection Load."

BACKGROUND OF THE INVENTION

This invention relates to reduction of energization transients in three phase power systems and more particularly to a method of reducing energization transients and to an apparatus for limiting energization transients.

Transformers, reactors and capacitors are common equipment in utility power systems. When such equipment is energized by a power system it normally produces energization transients such as voltage and/or current surges. These transients are often the result of inrush currents into the load being energized. Energization transients are often reflected back into the power system which can disrupt the operation of power quality sensitive electrical loads such as computers and medical equipment connected to the system. Power quality sensitive electronics are in increasing use and thus control of energization transients has become an important concern to the power industry.

Over the past twenty years, two main methods have evolved to limit inrush currents as a way of reducing energization transients. A first method involves pre-insertion of damping resistors or inductors. This involves insertion of an impedance such as a resistor and/or inductor in series with each leg of the load. Each resistor and/or inductor is then bypassed after the leg has been energized and has reached a steady state condition. The use of a resistor tends to increase the damping of the overall circuit, resulting in faster disappearance of transients. The main disadvantage of this method is the need for a separate bypass circuit breaker and resistor for each phase. Systems of this type are described in U.S. Pat. Nos. 6,018,473, 6,218,652, 4,695,918, for example.

A second method involves precisely controlling the closing instant of the switches or breakers connecting the load to the power system such that each breaker is closed at precisely the instant when the system voltage or current, depending on the load, in the corresponding phase is zero. If the load is capacitive, the breaker associated with each phase is closed when the voltage of the corresponding phase is zero. If the load is inductive, the breaker is closed when the voltage is maximum and current is zero. With the advancement of microprocessor technology, this method has become technically feasible and has gained acceptance in industry. This method however requires specially designed circuit breakers that have consistent mechanical operation characteristics over a wide range of installation and temperature conditions. The tolerance for error on closing time is very small (less than 2 to 5 milliseconds). The reliability of such a scheme and the sophistication involved makes it unattractive for general applications. This technology and its variations are described in U.S. Pat. Nos. 5,838,077, 6,523,654, for example.

A variation of the first method above, for use with transformer loads involves the connection of a resistor between the transformer neutral and ground. This scheme has been described in B. Holmgrem, R. S. Jenkins and J. Rinbrugent, "Transformer inrush current," *CIGRE Proc. Of the 22nd session*, vol. 1, 12-03, pp. 1-13, 1968 and R. Yacamini and A. Abu-Nasser, "The calculation of inrush current in three-phase transformers," *IEE Proc.-Electr. Power Appl.*, vol. 133, no. 1, pp. 31-40, January 1986. Both papers describe concurrent energization of all three legs and both concluded that the neutral resistor has no effect on limiting inrush currents.

Another attempt to simplify the first method is described in U.S. Pat. No. 6,337,802 and involves the use of one series resistor switched into different phases of the load so that the effect of three resistors is at least partially realized. This method appears to be suited for low or medium voltage converter applications and could be more expensive than the basic series resistor method if applied to high voltage power systems as it requires several additional switches.

The present invention addresses the above problems.

SUMMARY OF THE INVENTION

The invention provides a method and an apparatus for reducing energization transients in a three phase AC power system comprising an electrical device having legs A, B and C which are associated with corresponding phases of the power system.

The invention provides an energization sequence for connecting the legs of the device with the power system. In some embodiments, the invention may further provide for a transient-limiting impedance connected in series with leg A, which transient-limiting impedance may be associated with a bypass switch for bypassing the transient-limiting impedance in a modified energization sequence.

In a method aspect, the invention is a method of reducing energization transients in a three phase AC power system comprising an electrical device having legs A, B and C associated with corresponding phases of the power system, the method comprising the steps of connecting the legs of the device with the power system in an order determined by an energization sequence, wherein the energization sequence is either ABC or ACB.

In an apparatus aspect, the invention is an apparatus for limiting energization transients in a three phase AC power system comprising:
  (a) a three phase electrical device having legs A, B and C associated with corresponding phases of the power system; and
  (b) switches operable to connect the legs A, B and C of the device with the power system, wherein the switches are configured to be actuated in an order determined by an energization sequence, and wherein the energization sequence is either ABC or ACB.

The device may be comprised of any type of three phase electrical device which may cause energization transients when connected with the power system. The device may be inductive or capacitive in nature. The device may be grounded or ungrounded. In preferred embodiments, the device is a transformer or a generator such as an induction generator. The device may be configured in any suitable manner. For example, the device may comprise a delta configuration, a wye configuration or a combination of delta and wye configurations.

The energization transient may be comprised of current or voltage.

The switches of the apparatus may be comprised of any suitable electrical switching device. The switches may be comprised of circuit breakers. The switches may include first, second and third switches associated with legs A, B and C respectively.

The switches of the apparatus may be controlled in any suitable manner. For example, the switches may be controlled manually or may be configured to operate automatically according to a preset schedule or with appropriate preset delays. Preferably the switches are controlled by a switch controller which is operable to actuate the switches to produce the energization sequence.

The energization sequence may define a first step of the method, a second step of the method and a third step of the method. A period of time may separate the performance of the steps after the first step.

The period of time may be greater than or equal to a time period associated with approximately one cycle of an AC waveform associated with the power system. The period of time may be greater than about 0.01 seconds. The period of time may be between approximately 0.01 seconds and approximately 1 second. In general, the period of time may be as short as one or several cycles or as long as several seconds. The period of time should, however, be long enough to permit the energization transient produced in a preceding step to be diminished to an acceptable level.

Where the device is an ungrounded device, the period of time separating the first step and the second step is less important, since two legs of the device must be connected with the power system in order to complete a circuit. As a result, where the device is an ungrounded device, the period of time may be less than the period of time between the second step and the third step or the first step and the second step may be performed simultaneously so that a period of time separates only the performance of the third step from the performance of the second step.

Where the device is an ungrounded device, the first step and the second step are effectively performed simultaneously even if the second step is actually performed before the first step, since no circuit is completed, and no energization transients are produced, until both the first step and the second step have been performed.

The apparatus may be further comprised of a transient-limiting impedance connected in series with leg A of the device and may be further comprised of a bypass switch for bypassing the transient-limiting impedance which is associated with the transient-limiting impedance. The method may thus be further comprised of the step I of bypassing the transient-limiting impedance, which step I may be comprised of actuating the bypass switch. The switch controller of the apparatus may be operable to actuate the bypass switch. The step of bypassing the transient-limiting impedance prevents the device from being unbalanced following connection of legs A, B and C to the power system.

The energization sequence may in such circumstances be either ABCI, ABIC, ACBI or ACIB. The energization sequence may define a first step of the method, a second step of the method, a third step of the method and a fourth step of the method, and a period of time may separate the performance of the steps after the first step.

Where the device is an ungrounded device, the period of time may be less than the period of time between the second step and the third step or the first step and the second step may be performed simultaneously so that a period of time separates the performance of the steps after the performance of the second step.

Where the device is an ungrounded device, the first step and the second step are effectively performed simultaneously even if the second step is actually performed before the first step, since no circuit is completed, and no energization transients are produced, until both the first step and the second step have been performed.

The switches and the bypass switch may be controlled in any suitable manner. For example, the switches may be controlled manually or may be configured to operate automatically according to a preset schedule or with appropriate preset delays. Preferably the switches and the bypass switch are controlled by a switch controller which is operable to actuate the switches and the bypass switch to produce the energization sequence.

The transient-limiting impedance may include at least one of a resistive component and a reactive component. The transient-limiting impedance may be exclusively or predominantly resistive. The transient-limiting impedance may include both a resistive component and an inductive reactive component.

The transient-limiting impedance may be selected so that a maximum energization transient experienced by the device and/or the power system during the energization sequence is within an acceptable range. Alternatively, the transient-limiting impedance may be selected so that the maximum energization transient is minimized.

The method and apparatus of the invention are simple and cost-effective. Precise control or synchronization of the switch closing instants when performing the energization sequence is not required thereby allowing the use of relatively inexpensive switches or breakers and switching controllers. Since the transient-limiting impedance is bypassed during the energization sequence, it will be appreciated that the rating of the transient-limiting impedance can be relatively low since the transient-limiting impedance does not carry voltage or current when the energized power system enters a balanced steady state.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Referring to FIGS. 1-4, embodiments of an apparatus (10) for limiting energization transients in a three phase AC power system are shown.

In each of FIGS. 1-4, the apparatus (10) includes a three phase electrical device (12) having legs A, B and C associated with corresponding phases of a three phase AC power system (13). Reference to the sequence of legs A, B and C includes reference to the sequence of legs B, C and A and to the sequence of legs C, A, and B, since the labels A, B and C are sequential but arbitrary.

Figure 1:
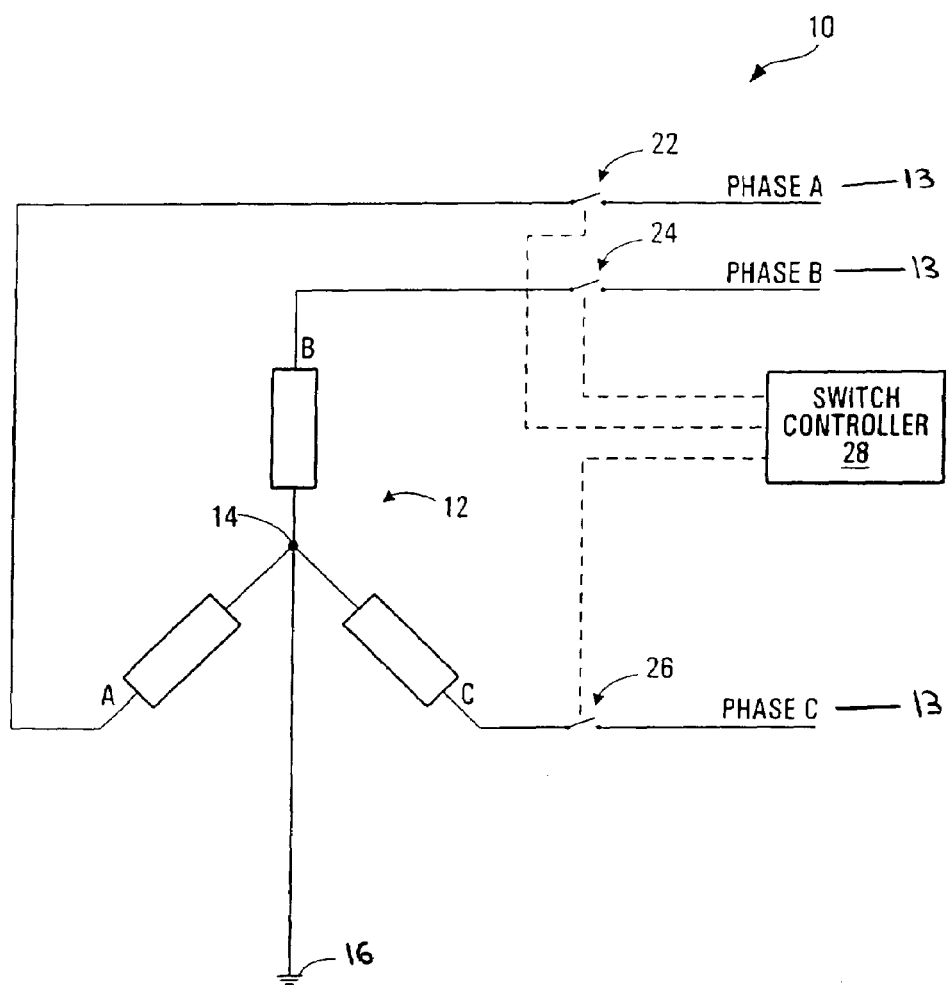
FIG. 1 is a schematic diagram of an apparatus according to an embodiment of the invention in which the device is a grounded device in a wye configuration.
Figure 2:
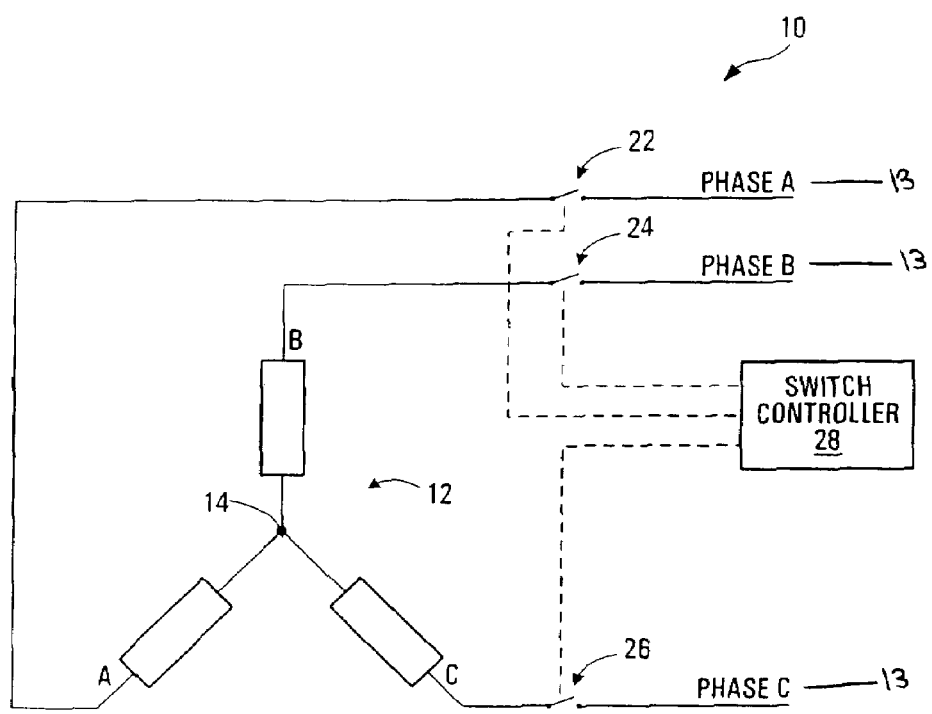
FIG. 2 is a schematic diagram of an apparatus according to an embodiment of the invention in which the device is an ungrounded device in a wye configuration.
Figure 3:
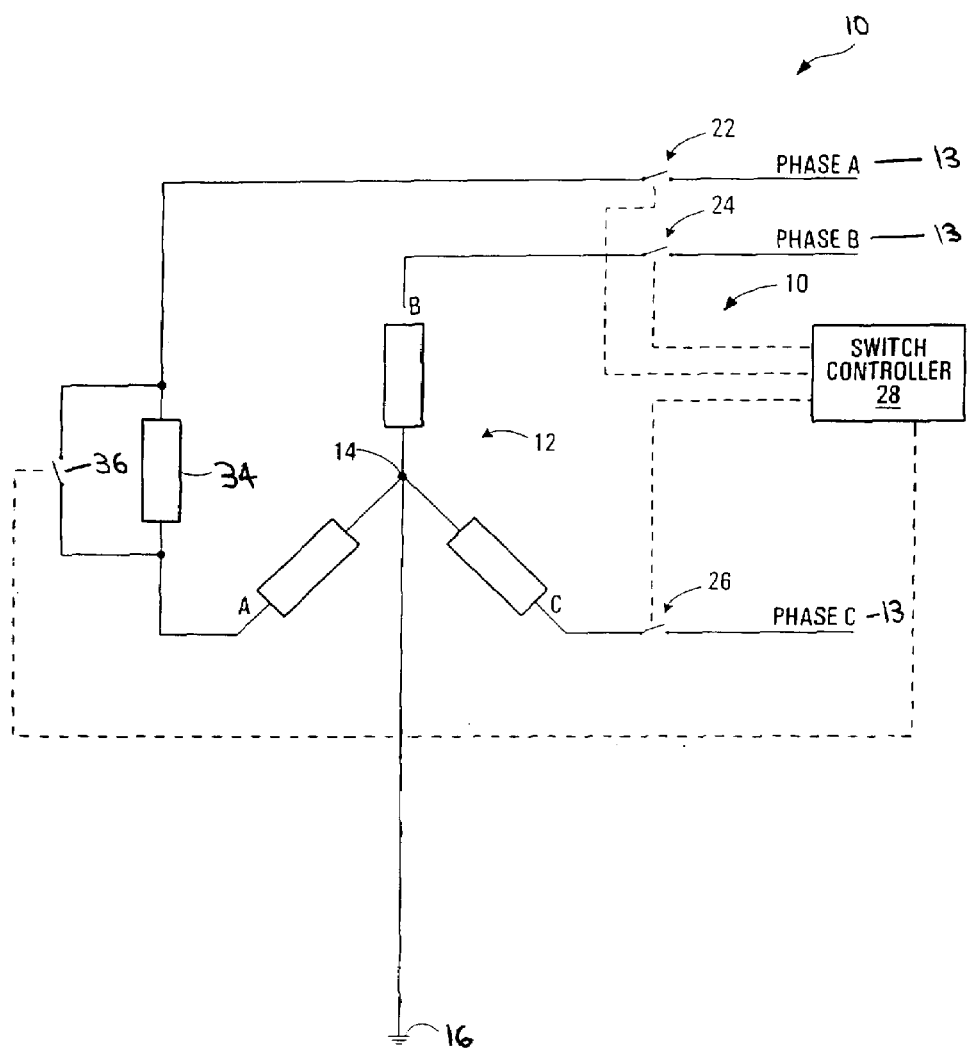
FIG. 3 is a schematic diagram of an apparatus according to an embodiment of the invention in which the device is a grounded device in a wye configuration, including a transient-limiting impedance and a bypass switch.
Figure 4:
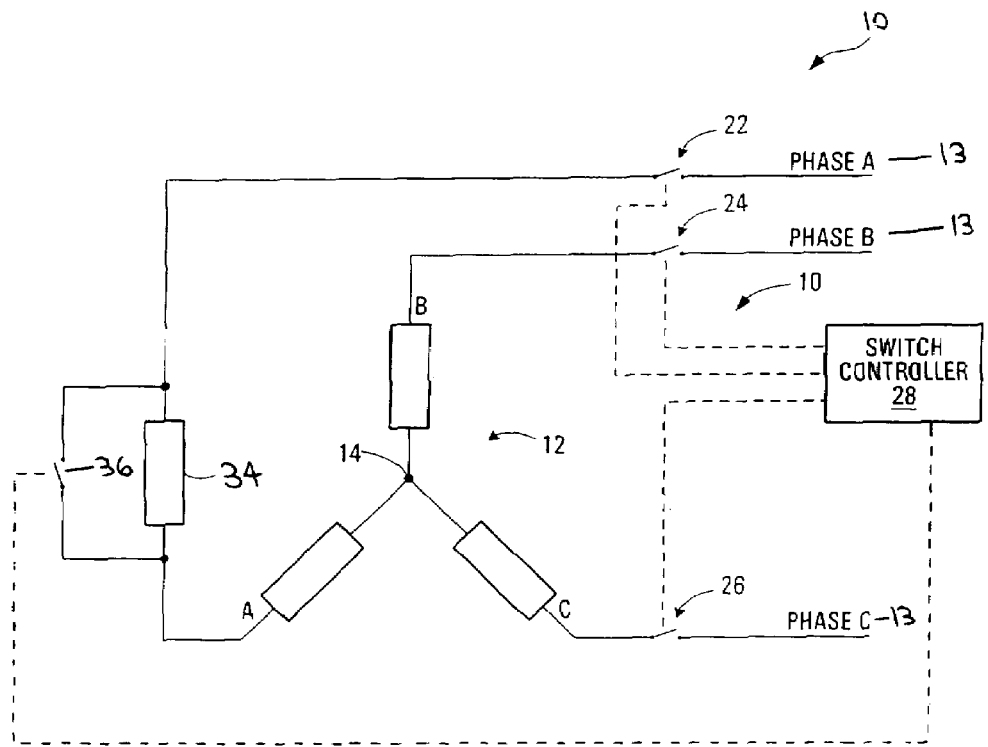
FIG. 4 is a schematic diagram of an apparatus according to an embodiment of the invention in which the device is an ungrounded device in a wye configuration, including a transient-limiting impedance and a bypass switch.

For exemplary purposes, the device 12 is depicted in FIGS. 1-4 in a wye configuration and thus includes a common neutral (14). The device (12) may, however, be arranged in a delta configuration or in some other configuration. In FIG. 1 and FIG. 3, the device (12) includes a ground (16). In FIG. 2 and FIG. 4, the device (12) is ungrounded.

The device (12) may be comprised of any three phase electrical device which may cause energization transients when connected with the power system (13). The device (12) may be inductive or capacitive in nature. In the preferred embodiments the device (12) is comprised of either a transformer or an induction generator.

The apparatus is further comprised of switches which are operable to connect the legs A, B and C of the device (12) with the power system (13). A first switch (22) is operable to connect leg A of the device (12) with the power system (13). A second switch (24) is operable to connect leg B of the device (12) with the power system (13). A third switch (26) is operable to connect leg C of the device (12) with the power system (13). The switches (22, 24, 26) may include circuit breakers.

In the preferred embodiments the switches (22, 24, 26) are connected with a switch controller (28) which is operable to actuate the switches (22, 24, 26). Alternatively, the switches (22, 24, 26) may be actuated manually or the switches (22, 24, 26) may operate automatically according to a preset schedule or with appropriate preset delays.

Referring to FIG. 3 and FIG. 4, the apparatus (10) may be further comprised of a transient-limiting impedance (34) and a bypass switch (36) for bypassing the transient-limiting impedance (34). The transient-limiting impedance (34) is connected in series with leg A of the device (12).

In the preferred embodiments the bypass switch (36) is actuated by the switch controller (28). Alternatively the bypass switch (36) may be actuated manually or the bypass switch (36) may operate automatically according to a preset schedule or with an appropriate preset delay.

The switch controller (28) may be comprised of a single switch controller apparatus or may be comprised of a plurality of switch controller apparatus functioning together.

FIG. 1 and FIG. 2 represent a first embodiment of the apparatus (10) which does not include the transient-limiting impedance (34) and the bypass switch (36). FIG. 3 and FIG. 4 represent a second embodiment of the apparatus (10) which does include the transient-limiting impedance (34) and the bypass switch (36).

By actuating the switches (22, 24, 26) in the first embodiment of the apparatus (10) and additionally bypass switch (36) in the second embodiment of the apparatus (10) in an order defining an energization sequence as provided for by the method of the invention, energization transients such as current or voltage can be reduced.

In the method using the first embodiment of the apparatus (10), the energization sequence is either ABC or ACB. Both of these two energization sequences have been found to be effective to reduce energization transients during connection of the device (12) with the power system (13), regardless of the type of the device (12) or whether the device (12) includes the ground (16) or is ungrounded.

In the method using the second embodiment of the apparatus (10), the energization sequence of the invention is ABCI, ABIC, ACBI or ACIB, where I represents actuation of the bypass switch (36) to bypass the transient-limiting impedance (34). The inclusion of the transient-limiting impedance (34) in the second embodiment of the apparatus (10) has been found to be effective to reduce further (in comparison with the first embodiment of the apparatus (10)) the energization transients caused during connection of the device (12) with the power system (13), regardless of the type of the device (12) or whether the device (12) includes the ground (16) or is ungrounded.

Actuation of the bypass switch (36) to bypass the transient-limiting impedance (34) is necessary in the use of the second embodiment of the apparatus (10) to minimize power loss and voltage imbalance which may otherwise occur after the device (12) has been fully connected with the power system (13).

In the method using the second embodiment of the apparatus (10), other possible energization sequences are AIBC and AICB. It has been found that these two possible energization sequences provide little or no added benefit in comparison with the energization sequences ABC and ACB as employed in the method using the first embodiment of the apparatus (10).

In circumstances where the device (12) is ungrounded, connecting leg A with the power system (13) will not result in an electrical circuit, since leg A on its own provides no return path for the current. As a result, bypassing the transient-limiting impedance (34) before connecting leg B or leg C with the power system (13) where the device (12) is ungrounded essentially provides the energization sequences ABC and ACB as employed in the use of the first embodiment of the apparatus (10).

In circumstances where the device (12) includes the ground (16), bypassing the transient-limiting impedance (34) before connecting leg B or leg C with the power system (13) results in the transient-limiting impedance (34) being effective only to limit energization transients caused by the connection of leg A with the power system (13). In most cases the energization transients caused by the connection of leg B or leg C with the power system (13) are of greater significance than the energization transients caused by the connection of leg A with the power system (13). As a result, bypassing the transient-limiting impedance (34) before connecting leg B or leg C with the power system (13) where the device (12) includes the ground (16) typically provides marginal benefit over energization sequences ABC and ACB as employed in the use of the first embodiment of the apparatus (10).

In summary, the use of energization sequences ABC or ACB with the first embodiment of the apparatus (10) is effective to reduce energization transients caused by connecting the device (12) with the power system (13), and further reduction of energization transients may be possible by including the transient-limiting impedance (34) and the bypass switch (36) in the apparatus (10) and using energization sequences ABCI, ABIC, ACBI or ACIB with the second embodiment of the apparatus (10).

The energization sequences of the invention therefore provide a method for reducing energization transients in a three phase AC power system. For energization sequences ABC and ACB, the energization sequences each define a first step of the method, a second step of the method and a third step of the method. For energization sequences ABCI, ABIC, ACBI and ACIB, the energization sequences each define a first step of the method, a second step of the method, a third step of the method and a fourth step of the method.

Generally, a period of time should separate the performance of the steps of the method after the first step. One purpose of the period of time is to permit the energization transient produced in a preceding step of the method to be diminished to an acceptable level before performing the next step of the method.

It has been found that the period of time may be greater than or equal to a time period associated with approximately one cycle of an AC waveform associated with the power system. For a typical AC power system, the period of time may be greater than about 0.01 seconds, may be between approximately 0.01 seconds and approximately 1 second, and may be as short as one or several cycles or as long as several seconds.

Where the device (12) is ungrounded, the interval between the first step and the second step is less important, since the connection of leg A to the power system (13) does not result in an electrical circuit. As a result, where the device (12) is ungrounded, the period of time between the first step of the method and the second step of the method may be any length of time, or the first step and the second step may be performed simultaneously.

Where the device (12) is ungrounded, the first step and the second step are effectively performed simultaneously even if the second step is actually performed before the first step, since no circuit is completed, and no energization transients are produced, until both the first step and the second step have been performed.

Figure 5:
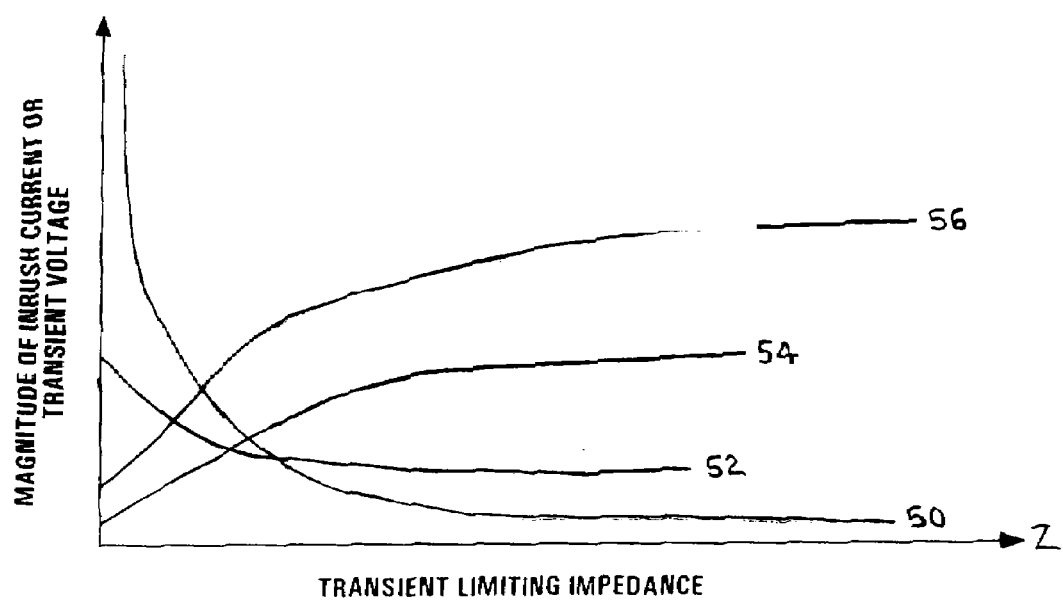
FIG. 5 is an exemplary graph depicting magnitude of energization transient versus transient-limiting impedance during an energization sequence ABCI for a grounded device.
Figure 6:
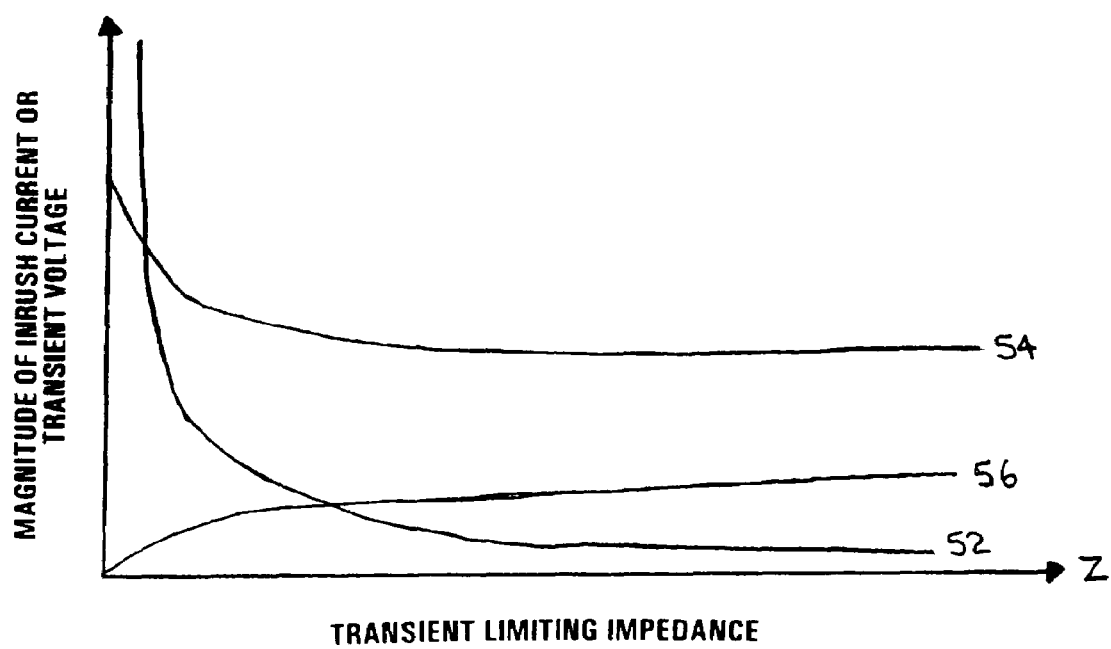
FIG. 6 is an exemplary graph depicting magnitude of energization transient versus transient-limiting impedance during an energization sequence ABCI for an ungrounded device.

Referring to FIG. 5, there is shown an exemplary graph depicting magnitude of energization transient versus transient-limiting impedance (34) during an energization sequence ABCI for a version of the second embodiment of the apparatus (10) where the device (12) includes the ground (16). Referring to FIG. 6, there is shown an exemplary graph depicting magnitude of energization transient versus transient-limiting impedance (34) during an energization sequence ABCI for a version of the second embodiment of the apparatus (10) which includes an ungrounded device (12).

In FIG. 5 and FIG. 6, a first step (50) of the method is connection of leg A of the device (12) with the power system (13), a second step (52) of the method is connection of leg B of the device (12) with the power system (13), a third step (54) of the method is connection of leg C of the device (12) with the power system (13), and a fourth step (I) of the method is actuation of the bypass switch (36) to bypass the transient-limiting impedance (34).

Graphs of the type depicted in FIG. 5 and FIG. 6 may be generated by experimentation, computer simulation or modelling, or by using any other suitable method or technique.

The transient-limiting impedance (34) may be comprised of a resistive component and/or a reactive component. In the preferred embodiments the transient-limiting impedance (34) is exclusively or predominantly resistive.

The appropriate value of the transient-limiting impedance (34) may be selected by observing the energization transients which are caused during the energization sequence for a range of values of transient-limiting impedance (34), which observations enable the development of graphs similar to those shown in FIG. 5 and FIG. 6, which graphs include a number of plotted curves.

The graph of FIG. 5 includes curves representing each of the four steps (50, 52, 54, 56) of the method, since the device (12) includes the ground (16). The graph of FIG. 6 includes curves representing only the second step (52), the third step (54) and the fourth step (56) of the method, since the device (12) is ungrounded and the first step (50) of the method does not therefore cause an energization transient.

By superimposing the curves representing the steps (50, 52, 54, 56) of the method, the energization transients caused during each step (50, 52, 54, 56) of the energization sequence for a range of values of the transient-limiting impedance (34) can be determined.

Assuming that the period of time between steps (50, 52, 54, 56) is sufficient to permit substantial diminishment of the energization transient between steps (50, 52, 54, 56), additive effects of the energization transients may be largely ignored. The transient-limiting impedance (34) may then be selected so that a maximum energization transient caused during the energization sequence is within an acceptable range or is minimized.

In one application of the invention, the device (12) may comprise a wye and/or delta configured transformer. In a second application of the invention, the device (12) may comprise a wye and/or delta configured induction generator. In other applications of the invention, the device (12) may comprise other types of three phase electrical devices or may comprise a combination of electrical devices.

In the application of the invention where the device (12) is comprised of a transformer, it is believed that the energization sequence ABC (for the first embodiment of the apparatus (10)) or ABCI (for the second embodiment of the apparatus (10)) may be preferred.

In the application of the invention where the device (12) is comprised of an induction generator, it is believed that the energization sequence ABC (for the first embodiment of the apparatus (10)) or ABCI (for the second embodiment of the apparatus (10)) may be preferred.

The selection of the optimum energization sequence, the optimum period of time between steps of the method, and the optimum nature and value of the transient-limiting impedance (34) are, however, dependent upon the specific characteristics of the device (12) and the power system (13).

What is claimed is:

1. A method of reducing energization transients in a three phase AC power system comprising an electrical device having legs A, B and C associated with corresponding phases of the power system, the method comprising the steps of connecting the legs of the device with the power system in an order determined by an energization sequence, wherein a transient-limiting impedance is connected in series with leg A, wherein the method is further comprised of the step I of bypassing the transient-limiting impedance, and wherein the energization sequence is either ABCI, ABIC, ACBI or ACIB.

2. The method as claimed in claim 1 wherein each of the energization sequences defines four steps comprising a first step of the method, a second step of the method, a third step of the method, and a fourth step of the method, wherein the four steps provide for connecting each of the legs A, B and C of the device and for bypassing the transient-limiting impedance, wherein A is comprised of connecting leg A, wherein B is comprised of connecting leg B, wherein C is comprised of connecting leg C and wherein I is comprised of bypassing the transient-limiting impedance and wherein a period of time separates the performance of the steps after the first step.

3. The method as claimed in claim 2 wherein the device is a grounded device.

4. The method as claimed in claim 3 wherein the period of time is long enough to permit the energization transient produced in a preceding step of the method to be diminished to an acceptable level.

5. The method as claimed in claim 3 wherein the period of time is greater than or equal to a time period associated with approximately one cycle of an AC waveform associated with the power system.

6. The method as claimed in claim 1 wherein each of the energization sequences defines four steps comprising a first step of the method, a second step of the method, a third step of the method, and a fourth step of the method, wherein the four steps provide for connecting each of the legs A, B and C of the device and for bypassing the transient-limiting impedance, wherein A is comprised of connecting leg A, wherein B is comprised of connecting leg B, wherein C is comprised of connecting leg C and wherein I is comprised of bypassing the transient-limiting impedance, wherein the device is an ungrounded device, and wherein a period of time separates the performance of the steps after the performance of the second step.

7. The method as claimed in claim 6 wherein the period of time is long enough to permit the energization transient produced in a preceding step of the method to be diminished to an acceptable level.

8. The method as claimed in claim 6 wherein the period of time is greater than or equal to a time period associated with approximately one cycle of an AC waveform associated with the power system.

9. The method as claimed in claim 6 wherein the first step and the second step are performed simultaneously.

10. The method as claimed in claim 1 wherein the transient-limiting impedance is selected so that a maximum energization transient during the energization sequence is within an acceptable range.

11. The method as claimed in claim 1 wherein the transient-limiting impedance is selected so that a maximum energization transient during the energization sequence is minimized.

12. The method as claimed in claim 1, further comprising the step of selecting the transient-limiting impedance so that a maximum energization transient during the energization sequence is within an acceptable range.

13. The method as claimed in claim 1, further comprising the step of selecting the transient-limiting impedance so that a maximum energization transient during the energization sequence is minimized.

14. The method as claimed in claim 1 wherein the device is comprised of a transformer.

15. The method as claimed in claim 1 wherein the device is comprised of a generator.

16. An apparatus for limiting energization transients in a three phase AC power system comprising:
    (a) a three phase electrical device having legs A, B and C associated with corresponding phases of the power system;
    (b) switches operable to connect the legs A, B and C of the device with the power system, wherein the switches are configured to be actuated in an order determined by an energization sequence;
    (c) a transient-limiting impedance connected in series with leg A; and
    (d) a bypass switch for bypassing the transient-limiting impedance, wherein I is actuation of the bypass switch to bypass the transient-limiting impedance, and wherein the switches and the bypass switch are configured to be actuated such that the energization sequence is either ABCI, ABIC, ACBI or ACIB.

17. The apparatus as claimed in claim 16 wherein the device is comprised of a transformer.

18. The apparatus as claimed in claim 16 wherein the device is comprised of a generator.

19. The apparatus as claimed in claim 16, further comprising a switch controller operable to actuate the switches and the bypass switch to produce the energization sequence.

20. The apparatus as claimed in claim 16 wherein the transient-limiting impedance is selected so that a maximum energization transient during the energization sequence is within an acceptable range.

21. The apparatus as claimed in claim 16 wherein the transient-limiting impedance is selected so that a maximum energization transient during the energization sequence is minimized.

* * * * *